(No Model.)
C. BINGHAM.
KNEADING AND COOLING BOARD.
No. 491,977. Patented Feb. 21, 1893.
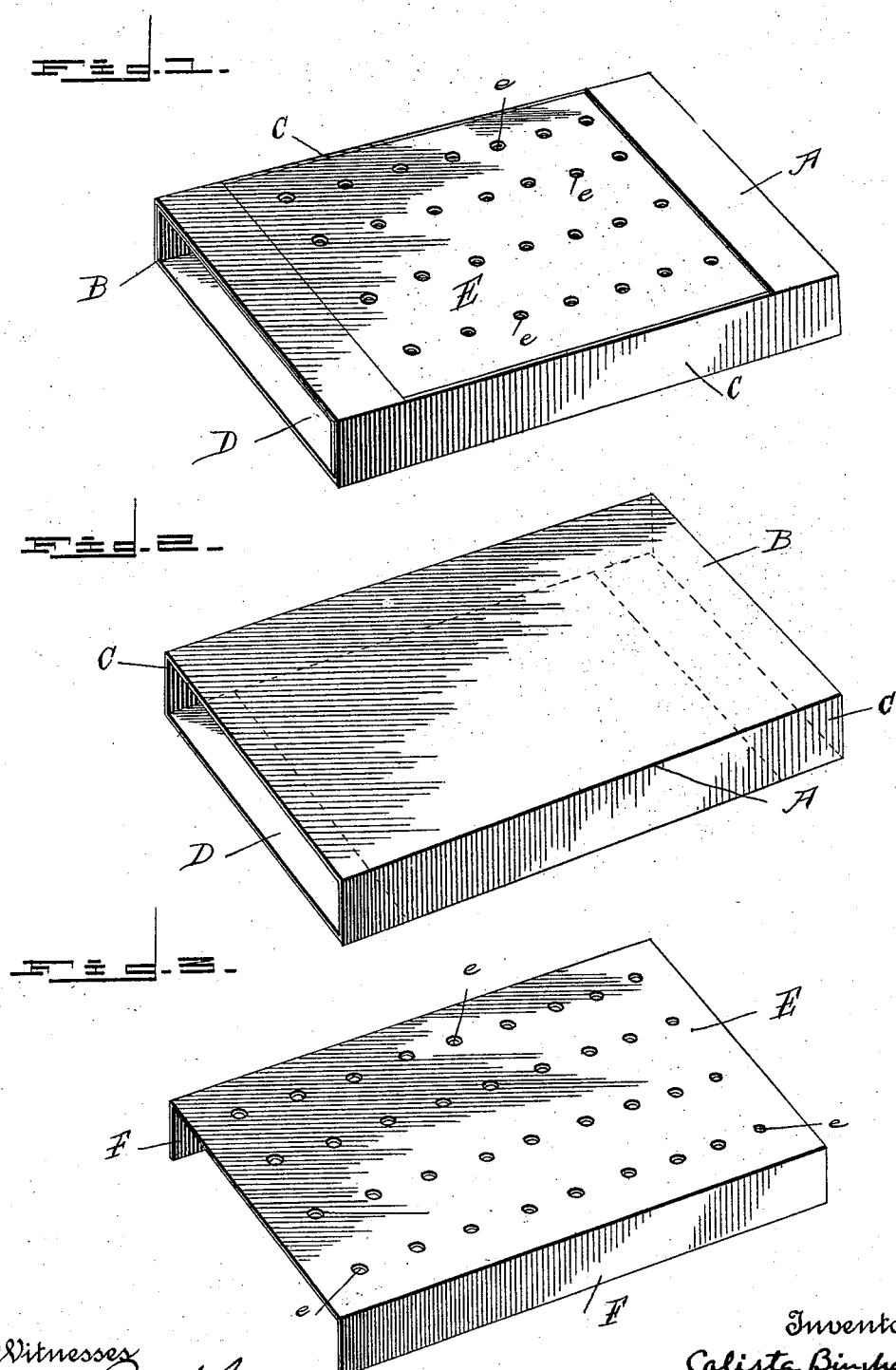
Witnesses
Inventor
Calista Bingham
By John Johns Jr.
Attorney

UNITED STATES PATENT OFFICE.

CALISTA BINGHAM, OF PADUA, ILLINOIS.

KNEADING AND COOLING BOARD.

SPECIFICATION forming part of Letters Patent No. 491,977, dated February 21, 1893.

Application filed September 15, 1892. Serial No. 445,940. (No model.)

*To all whom it may concern:*

Be it known that I, CALISTA BINGHAM, of Padua, in the county of McLean and State of Illinois, have invented certain new and useful Improvements in Kneading and Cooling Boards; and I do hereby declare the following to be a full, clear, and exact description of the invention, such as will enable others skilled in the art to which it appertains to make and use the same.

My invention relates to a combined kneading and cooling board and has for its object to provide such a device whereon the bread may be kneaded upon one side and the board then reversed to receive and support the bread after baking in such manner that air shall have free access to the bottom of the bread to aid in cooling the same and prevent moisture collecting thereon.

To these ends my invention consists in the novel and improved device hereinafter described and afterward definitely pointed out in the claim, due reference being had to the accompanying drawings, forming a part of this specification, wherein—

Figure 1 is a perspective view of my improved device, Fig. 2, a similar view, looking from the opposite side, and Fig. 3, a similar view, illustrating the cooling tray removed.

In the art of bread making and baking much annoyance is experienced and the quality of the bread impaired after the same is removed from the oven and set aside to cool by the hot vapors and steam escaping from the bread and condensing beneath the same, making the bottom of the bread moist and heavy. To remedy this serious defect, I provide means for admitting to the bottom of the bread a free circulation of air whereby the collection of moisture thereon is rendered impossible and the bread is cooled equally and uniformly throughout, and the same device upon its opposite side, is used as a board for kneading the dough preparatory to baking, all of which I will now proceed to describe.

Referring to the drawings, the letter A indicates a hollow, flat casing, consisting of a kneading board B having side walls C, C, and an open bottom D. In making the bread the board B is placed uppermost and used to knead the dough upon. Within the casing A is arranged a removable cooling board E. Said board is provided with numerous perforations e and at its sides with flanges F, F, upon which it is designed to rest. After the bread has been baked the casing A is inverted and the hot bread placed upon the cooling board E, the air freely circulating beneath the same and in contact with the bottom thereof, preventing the collection of moisture and insuring the equal and uniform cooling of the bread throughout. If desired, the cooling board E may be removed from the casing A before placing the bread thereon.

The device may be made of wood, metal, or any suitable substance as desired, and of any preferred dimensions.

If preferred, the removable cooling board may be omitted and the perforations formed in the bottom of the casing.

What I claim is—

The improved kneading and cooling board herein described, consisting of a hollow, flat casing, having one of its sides formed solid to constitute a kneading board and its other side perforated to receive the baked bread to cool the same, substantially as described.

In testimony whereof I have signed this specification in the presence of two subscribing witnesses.

CALISTA BINGHAM.

Witnesses:
SAM WELTY,
S. L. SMITH.